Dec. 27, 1966  H. HODKINSON  3,294,200
ADJUSTMENT DEVICE FOR DISC BRAKES
Filed Aug. 18, 1964  2 Sheets-Sheet 1
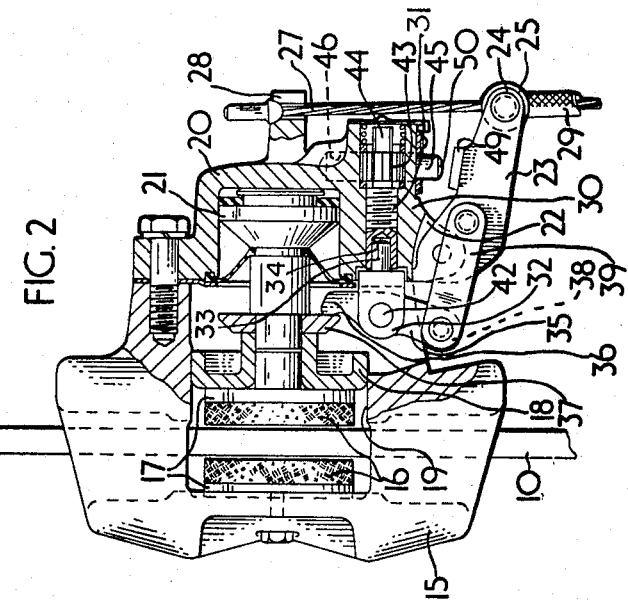
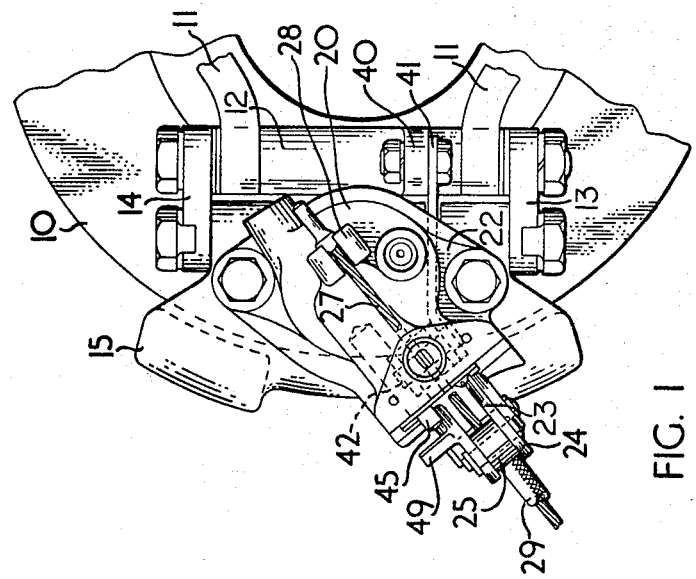

United States Patent Office 3,294,200
Patented Dec. 27, 1966

3,294,200
ADJUSTMENT DEVICE FOR DISC BRAKES
Harold Hodkinson, Finham, near Coventry, England, assignor to Dunlop Rubber Company, Limited, Fort Dunlop, Erdington, England, a corporation of Great Britain
Filed Aug. 18, 1964, Ser. No. 390,313
Claims priority, application Great Britain, Aug. 21, 1963, 33,016/63
5 Claims. (Cl. 188—73)

In our co-pending United States Patent application No. 374,733 filed June 12, 1964, now Patent No. 3,258,090, we have described a disc brake of the kind in which the friction elements are supported on opposite sides of a brake disc by an axially movable caliper-type housing, one of the friction elements being fixed to the housing while the other friction element is movable toward and away from the first friction element by a brake-applying mechanism fixed to the housing, the housing serving to transmit the reaction of the brake-applying mechanism to press the first friction element against the disc simultaneously with the movable friction element.

The housing is provided with a stabilizing device in the form of an arm secured at one end to a support member forming a fixed part of the brake and at the other end to an adjustable member associated with the housing. The stabilizing device prevents undue axial movement of the housing when the brake is in the released condition and also ensures that the friction elements are maintained in correct adjustment relative to the disc when in the released position.

The object of the present invention is the provision of automatic adjustment means for said adjustable member.

According to the present invention a disc brake comprises a rotatable disc, a nonrotatable support, a caliper-type housing mounted on the support and movable axially relative to the disc, and a stabilizing device in the form of an arm rigidly secured at one end to the support and attached at its other end to a member mounted on the caliper-type housing and provided with automatic adjustment means for adjusting the axial position of said member relative to the housing.

Preferably the automatic adjustment means comprises a screw device operable by a ratchet wheel engageable by a pawl carried by a plunger which is actuated to position the pawl behind a fresh tooth on the ratchet wheel when movement of a hand brake operating means exceeds a predetermined amount. The plunger is returnd to its original position by resilient means when the brake is released thus rotating the ratchet wheel to re-position the housing relative to the disc to compensate for wear of the friction pads.

The present invention will now be described with reference to the accompanying drawings, of which:

FIGURE 1 is a side elevation of a disc brake incorporating an adjustment device according to the present invention;

FIGURE 2 is a plan view partly in cross-section showing the adjustment device;

Figure 4:
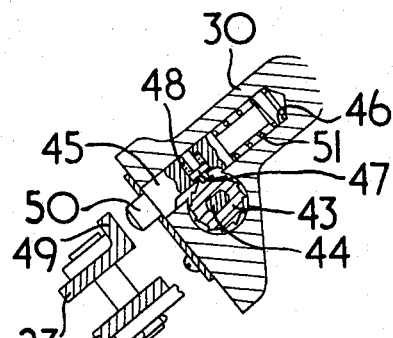
FIGURE 4 is a fragmental sectional view of the adjustment device.
Figure 3:
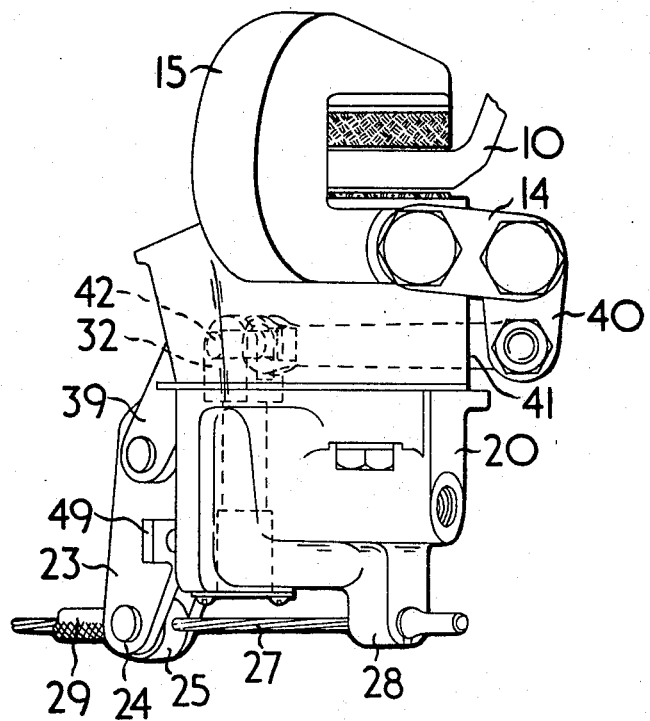
FIGURE 3 is an end elevation of the disc brake illustrated in FIGURE 1.

In one embodiment of the invention, as applied to a brake for a motor vehicle, a disc 10 is rigidly secured to a rotatable portion of the wheel to be braked and a support member in the form of a pair of spaced ears 11, extends from a nonrotatable portion of the vehicle frame. A tubular torque-taking member 12 is rigidly secured to the ears 11 and extends parallel to a chord of the disc 10 adjacent one side thereof. A pair of spaced links 13, 14 are pivotally attached one at each end of said tubular torque-taking member 12 and extend approximately parallel to a radius of the disc 10.

A caliper-type housing 15 is mounted between the two links, 13, 14 in such a manner that it is capable of moving bodily in a direction parallel to the axis of the disc 10 without tilting. The housing 15 straddles the outer periphery of the disc 10 and covers a minor portion only of the braking surface thereof.

A friction element, comprising a pad of friction material 16 attached to a backing plate 17 is provided adjacent each braking surface of the disc 10, the friction element on the side of the disc 10 remote from the support member being detachably secured to the housing while the friction element on the same side of the disc 10 as the support member is attached to a pressure plate 18, which is slidable towards and away from the disc 10 in an aperture 19 in the housing 15. The edges of the pressure plate 18 engage the aperture 19 so that the braking torque is readily transferred to the housing 15.

A brake actuating cylinder 20 is detachably secured to the housing 15 on the same side of the disc 10 as the support member and a piston 21 fluid-tightly slidable within the cylinder 20 is adapted to engage the thrust plate 18 to urge it, together with the associated friction element, towards the braking surface of the disc 10.

Under normal operating conditions fluid under pressure is introduced into the brake actuating cylinder 20 from a master cylinder or the like (not illustrated) to pressurise the piston 21 and force the slidable friction element into engagement with the adjacent braking surface of the disc 10. The resulting reaction forces set up on the cylinder 20 move the housing 15 axially with respect to the disc 10 to bring the friction element attached to the housing into engagement with the other side of the disc to effect full engagement of the brake.

The brake actuating cylinder 20 is provided on the outer surface thereof with a bracket 22 to which is pivotally secured a crank operating lever 23 arranged to extend axially away from the disc 10. The free end 24 of this operating lever 23 remote from the disc 10 is bifurcated and a trunnion block 25 is fitted thereto. The trunnion block 25 is provided with a central aperture through which passes an actuating cable 27 secured to a projection 28 extending from the closed end of the cylinder 20. The outer protective sheath 29 of said actuating cable abuts the trunnion block 25. The remote end of the actuating cable 27 is secured to a hand brake lever (not illustrated) or the like such that upon actuation of said hand brake lever the outer protective sheath 29 presses against the trunnion block 25 to bring about an angular movement of the crank operating lever 23 about its pivot point on the bracket 22.

A lug 30, formed on the outer surface of the brake actuating cylinder 20 adjacent to the bracket 22, is bored and tapped to threadedly receive an adjustment bolt 31 extending parallel to the axis of the disc 10 and forming part of a screw device for adjusting the axial position relative to the caliper of a bifurcated member 32 which is provided with a spigot 33 located in a central blind bore 34 of the adjustment bolt 31. The bolt 31 can thus rotate relative to the spigot 33 without disturbing the angular position of the bifurcated member 32 relative to the axis of the disc 10.

A pressure applying lever 35 is fulcrumed intermediate its ends to the bifurcated member 32. One end 36 of said lever is adapted to bear against a thrust plate 37 attached to the pressure plate 18 on the side thereof remote from the disc 10 while the other end 38 is pivotally secured to an intermediate lever 39. The intermediate lever 39 extends away from the disc 10 to pivotally engage the cranked operating lever 23 intermediate the ends thereof.

This arrangement of levers provides for mechanical actuation of the brake in addition to the fluid pressure mechanism in the following manner.

Operation of the hand brake lever brings about an angular movement of the cranked operating lever 23 about its pivot point on the bracket 22. This causes one end of the intermediate lever 39 to move in an arc around the pivot point of the cranked lever 23 and thereby rock the pressure applying lever 35 about its fulcrum on the bifurcated member 32. The rocking action of the pressure applying lever 35 moves the pressure plate 18 together with its associated friction element into engagement with the disc 10 and thereby sets up a reaction force which moves the housing 15 axially of the disc 10 to bring the other friction element into engagement with the opposite braking surface of the disc 10.

The tubular torque-taking member 12 is provided with a bracket 40, extending substantially parallel to the axis of the disc 10, to which is rigidly bolted a stabilizing arm 41.

The stabilizing arm 41 extends substantially parallel to the braking surface of the disc 10 to engage the bifurcated member 32 and is secured thereto by means of a pivot pin 42 passing through the stabilizing arm 41 and the bifurcated member 32. The stabilizing arm 41 is secured rigidly to the bracket 40 to prevent any undue axial movement of the housing 15 when the brakes are in the released position. It is important that the stabilizing arm 41 is not too rigid but possesses a certain amount of resilience in order that the housing can follow any "run out" of the disc.

As wear of the friction material 16 takes place during brake operation the movement of the fluid pressure operated piston 21 or the cranked operating lever 23 will have to be increased in order to maintain the friction material 16 in full engagement with the braking surface of the disc 10. This movement can be reduced to its original value on the next application of the brake by rotating the adjustment bolt 31 in the appropriate direction to apply a thrust on to the end of the stabilizing arm 41 which will tend to urge it towards the disc 10.

As previously explained the stabilizing arm 41 is rigidly secured to the support member 12 and is thus locked in a substantially constant position relative to the disc 10 at all times. Therefore the thrust applied to the stabilizing arm 41 by rotating the adjustment bolt 31 reacts upon the housing 15 to move it in an axial direction relative to the disc 10 and thereby draw the friction element secured to the housing 15 towards the adjacent braking surface of the disc 10. The movement of the housing 15 also pivots the pressure-applying lever 35 to a new inoperative position and thereby limits the amount that the thrust plate 37 can move away from the disc 10.

In accordance with the present invention the rotation of the adjustment bolt 31 is achieved by automatic adjustment means actuated by the cranked operating lever 23 when the angular movement thereof exceeds a predetermined amount.

The automatic adjustment means comprises a ratchet wheel 43 secured to a reduced diameter portion 44 of the adjustment bolt 31 at the end thereof remote from the bifurcated member 32. The ratchet wheel 43 is secured to the adjustment bolt 31 in such a way that it is rotatable therewith but can move longitudinally along the reduced diameter portion 44 to permit axial movement of the bolt 31.

A plunger 45, located in a blind recess 46 formed in the lug 30, and extending at right angles to the axis of the ratchet wheel, carries a pawl 47 (see FIGURE 4) which is urged by a spring 48 into engagement with the ratchet wheel 43. One end 50 of the plunger 45 projects from the side wall of lug 30 to a position where it is engaged by a thrust pad 49 formed on the cranked operating lever 23.

When angular movement of the cranked operating lever 23 exceeds the predetermined amount, the thrust pad 49 engages the projecting end 50 of the plunger 45 to displace it in the bore of the recess 46, compressing a spring 51 interposed between the plunger 45 and the base of the recess 46, and also positioning the pawl 47 behind a fresh tooth on the ratchet wheel.

When the brake is released, the friction exerted between the threads of the adjustment bolt 31 and the lug 30 is reduced and the compressed spring 51 returns the plunger 45 to its original position, thereby rotating the adjustment bolt 31 and advancing said bolt relative to the cylinder 20 to take up the clearances due to friction pad wear in the manner described above. Although the present invention is illustrated and described in connection with the single example embodiment, it will be understood that this is illustrative of the invention and is by no means restrictive thereof.

It is reasonably to be assumed that those skilled in this art can make numerous revisions and adaptations of the invention to suit design requirements and it is intended that such revisions and adaptations of the invention will be included within the scope of the following claims as equivalents thereof.

Having now described my invention, what I claim is:

1. In a disc brake including a rotatable disc having spaced annular braking surfaces adapted to be frictionally engaged, a brake comprising nonrotatable support means, friction pads, one on each side of said disc and engageable with a respective annular braking surface, a U-shaped caliper-type housing mounted on said support means and adapted for axial movement relative to said disc to bring one of said pads against a confronting opposed disc surface, a stabilizing device secured at one end to said support means, means forming an articulated connection between the other end of said stabilizing device and said caliper-type housing for defining the operative axial position of said housing, and an automatic adjuster means disposed between said device and housing for determining said axial position of said housing relative to said stabilizing device and thereby position the friction pads, one on each side of said disc, said automatic adjuster including operator means for actuating said adjuster means responsive to movement of said friction pads beyond a predetermined amount.

2. The disc brake structure in accordance with claim 1, wherein said automatic adjuster comprises a pawl-and-ratchet means carried by said housing operatively driven by the displacement of a plunger effected by said operator means and subsequent return thereof by a resilient means, threaded means in said housing disposed transversely to the axis of movement of said plunger and movable by said pawl-and-ratchet means to compensate for wear within the brake incidentally to braking operation.

3. In a disc brake including a rotatable disc having spaced annular braking surfaces adapted to be frictionally engaged, a brake comprising a nonrotatable support means, a caliper-type housing mounted on said support means and movable axially relative to said disc, a friction pad operatively carried by said caliper type housing and adapted to frictionally engage said rotatable disc as said housing is moved axially relative to said disc, a stabilizing device comprised of an arm secured at one end to said support means and at the opposite end operatively secured by an articulated connection to said housing for defining the operative position of said housing, and adjuster means for adjustably defining the relative positioning between said housing and said stabilizing device, and a combination ratchet-and-pawl carried by said caliper-type housing and adapted for operating said adjuster means.

4. A brake structure in accordance with claim 3 wherein said adjuster means comprises a bolt, means forming a coacting threaded aperture in said caliper-type housing, and a threaded member adjustably movable within said threaded aperture to effect an adjustment.

5. Brake structure in accordance with claim 4 wherein said threaded member includes a bifurcated means and a pivot pin forming a connection between said bifurcated means and said stabilizing device.

References Cited by the Examiner

UNITED STATES PATENTS

| | | | |
|---|---|---|---|
| 2,669,327 | 2/1954 | Chamberlain et al. | |
| 2,889,896 | 6/1959 | Schulz et al. | 188—79.5 X |
| 2,966,964 | 1/1961 | Brueder | 188—73 |
| 3,090,468 | 5/1963 | Von Rucker | 188—73 |
| 3,129,789 | 4/1964 | Hodkinson | 188—72 |
| 3,134,459 | 5/1964 | Burnett et al. | 188—73 |

FOREIGN PATENTS

| | | |
|---|---|---|
| 1,060,672 | 7/1959 | Germany. |
| 1,246,519 | 10/1960 | France. |
| 1,286,818 | 1/1962 | France. |
| 757,522 | 9/1956 | Great Britain. |
| 885,169 | 12/1961 | Great Britain. |

MILTON BUCHLER, *Primary Examiner.*

G. E. A. HALVOSA, *Assistant Examiner.*